April 11, 1944.  E. A. FLEMING  2,346,211
NUT GATHERING DEVICE
Filed March 26, 1943   3 Sheets-Sheet 1
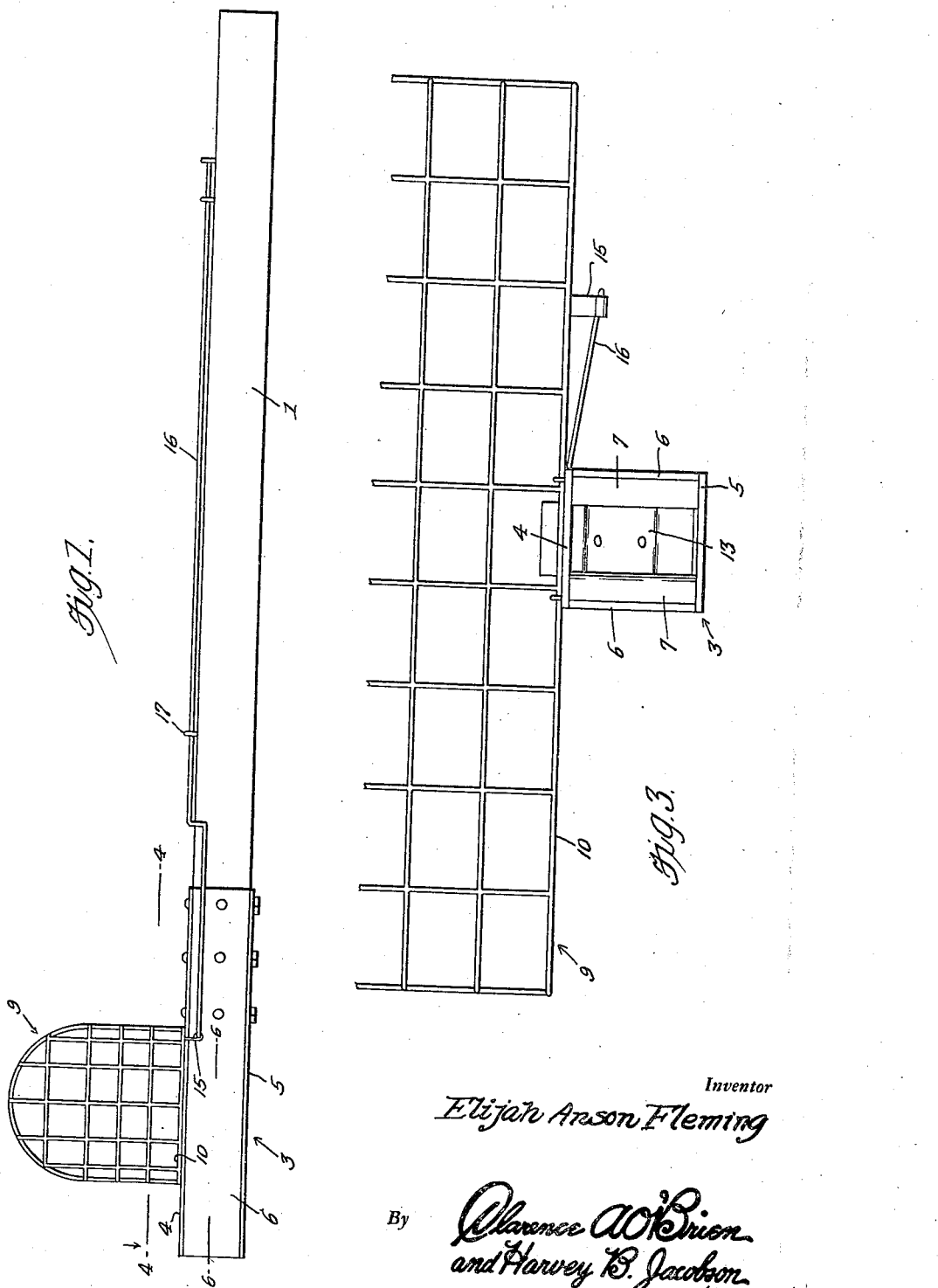
Inventor
Elijah Anson Fleming
By Clarence A. O'Brien
and Harvey B. Jacobson
Attorneys April 11, 1944.   E. A. FLEMING   2,346,211
NUT GATHERING DEVICE
Filed March 26, 1943   3 Sheets-Sheet 2
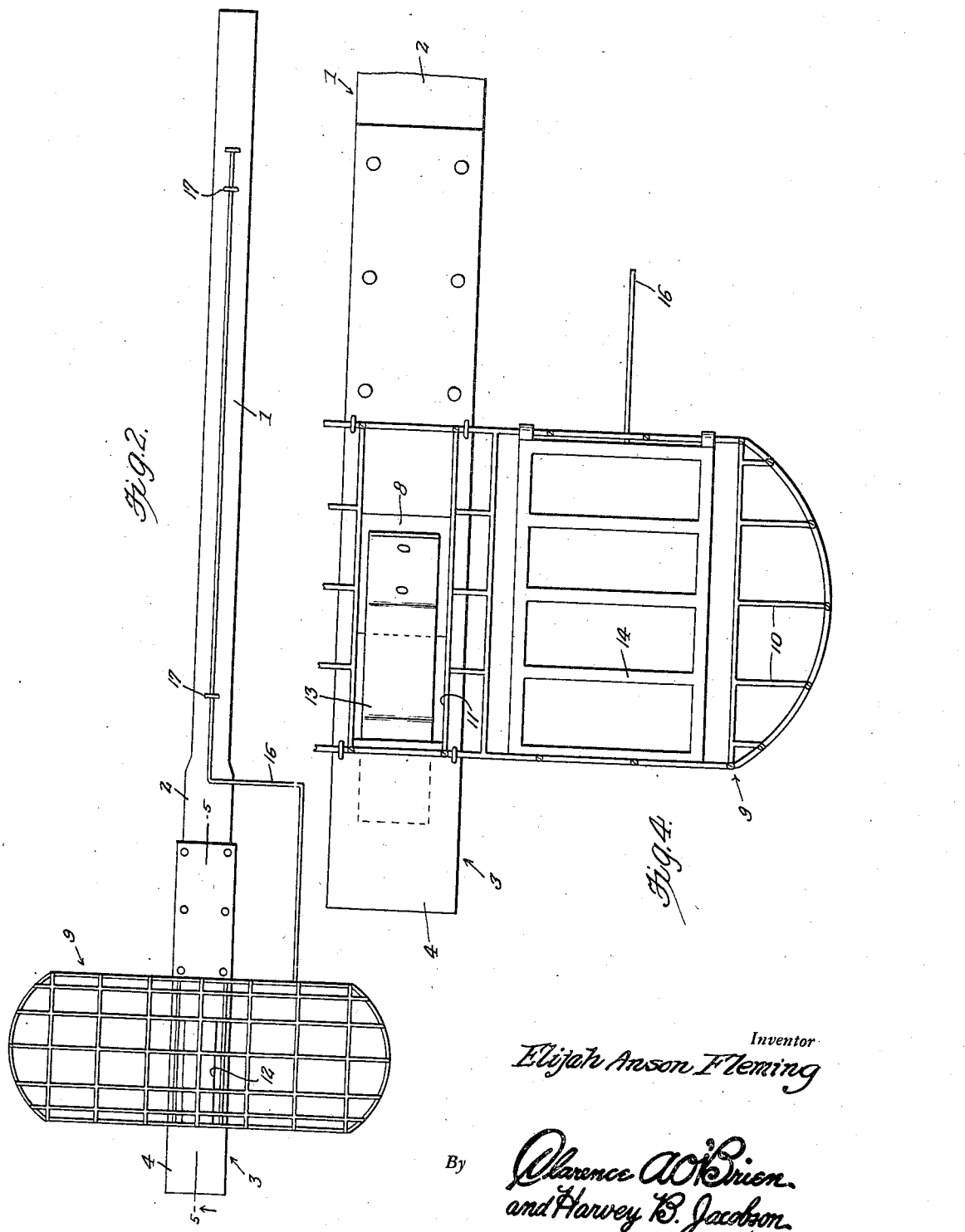
Inventor
Elijah Anson Fleming
By Clarence A. O'Brien
and Harvey B. Jacobson
Attorneys April 11, 1944.  E. A. FLEMING  2,346,211
NUT GATHERING DEVICE
Filed March 26, 1943   3 Sheets-Sheet 3
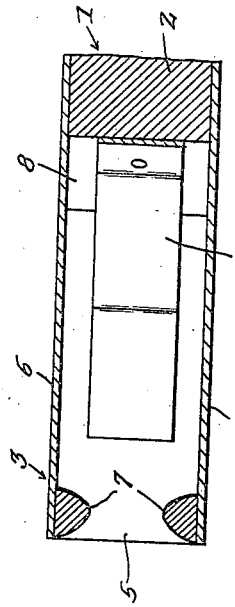
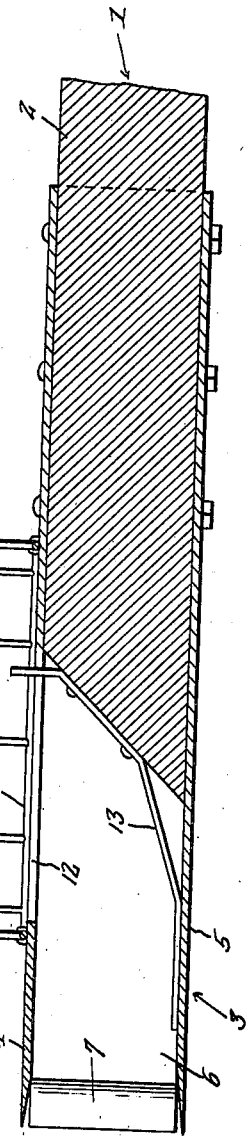
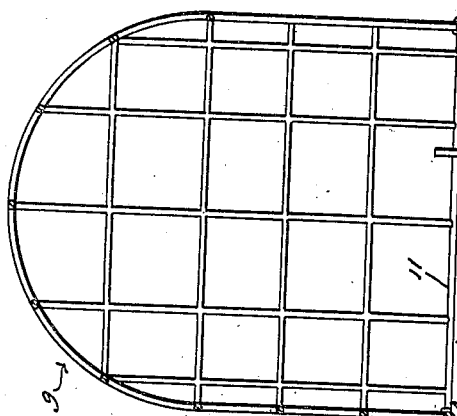
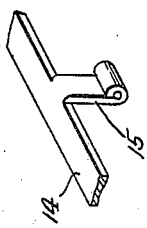
Inventor
Elijah Anson Fleming
By Clarence A. O'Brien
and Harvey B. Jacobson
Attorneys Patented Apr. 11, 1944

2,346,211

UNITED STATES PATENT OFFICE 2,346,211

NUT GATHERING DEVICE

Elijah Anson Fleming, Jackson, Miss.

Application March 26, 1943, Serial No. 480,686

1 Claim. (Cl. 56—339)

The present invention relates to new and useful improvements in nut gathering devices, and has for its primary object to provide, in a manner as hereinafter set forth, an implement of this character comprising a novel construction and arrangement whereby different kinds of nuts may be expeditiously picked up from the ground without the necessity of stooping.

Another very important object of the invention is to provide a nut gathering device of the aforementioned character which embodies unique means for retaining the nuts as they are gathered.

Other objects of the invention are to provide a nut gathering device of the character described which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a nut gathering device constructed in accordance with the present invention.

Figure 2 is a top plan view of the device.

Figure 3 is a view in front elevation, a portion only of the container being shown.

Figure 4 is a fragmentary view in horizontal section, taken substantially on the line 4—4 of Figure 1.

Figure 5 is a view in longitudinal section through the forward portion of the device, taken substantially on the line 5—5 of Figure 2.

Figure 6 is a fragmentary view in horizontal section, taken substantially on the line 6—6 of Figure 1.

Figure 7 is a detail view in perspective of a portion of the container closure.

Referring now to the drawings in detail, it will be seen that the embodiment of the invention which has been illustrated comprises an elongated handle 1 of suitable material, preferably wood, said handle including an enlarged forward end portion 2 which is substantially square in cross section. Mounted on the end portion 2 of the handle 1 and projecting longitudinally therefrom is a tube 3 of polygonal cross section.

The tube 3 comprises thin, flat top, bottom and side fingers 4, 5 and 6, respectively, of resilient material, said fingers being separate from each other. The resilient side fingers 6 have fixed on their free end portions and on their inner faces lips or the like 7, the purpose of which will be presently set forth. The handle 1 is provided with a beveled forward end 8 (see Fig. 5) which constitutes the rear end wall of the tube 3.

Mounted on the tube 3, above the forward end 8 of the handle 1, is a transversely elongated foraminous container 9 of suitable metal. The container 9 includes a flat bottom structure 10 which is formed to provide an opening 11 which communicates with an opening 12 in the top member 4 of the tube 3. A metallic guide 13 is mounted on the beveled forward end 8 of the handle 1 for directing the nuts upwardly into the container 9 from the tube 3. Of course, the nuts pass upwardly through the openings 12 and 11.

The bottom 10 of the container 9 further includes a hinged, downwardly and rearwardly swinging closure 14. In the embodiment shown, an arm 15 depends from the hinged end portion of the closure 14. A resilient operating rod 16 is pivotally connected, at one end, to the arm 15. The operating rod 16 is slidable in guides 17 which are provided therefor at spaced points on the handle 1.

It is thought that the manner of using the device will be readily apparent from a consideration of the foregoing. Briefly, the open mouth of the resilient, expansible tube 3 is forced over the nuts on the ground, the lips 7 being pushed past said nuts, the resilient side fingers 6 spreading to permit this. Of course, when the lips 7 pass the nuts, the fingers 6 close and said nuts are retained in the tube 3 by said lips. As the operation is repeated and the tube 3 fills, the nuts are forced upwardly through the openings 12 and 11 into the container 9. As hereinbefore stated, the guide 13, which projects through the openings 12 and 11, assists in directing the nuts into the container 9. To empty the container 9 when desired, the closure 14 is simply swung downwardly to open position through the medium of the rod 16. Any suitable means may, if necessary, be provided for releasably securing the closure 14 in closed position.

It is believed that the many advantages of a nut gathering device constructed in accordance with the present invention will be readily understood, and although a preferred embodiment of said device is as illustrated and described, it is to be understood that changes in the details of construction and in the combination and arrangement of parts may be resorted to which will fall within the scope of the invention as claimed.

What is claimed is:

A nut gathering device comprising an elongated handle, an expansible tube projecting longitudinally from one end of the handle, said tube including resilient, opposed top and bottom fingers and resilient, opposed side fingers, said tube being open at its forward end for the reception of nuts, retaining lips for the nuts mounted on certain of the fingers, said tube having a discharge opening for the nuts in the top finger thereof, a container mounted on the tube and communicating therewith through the discharge opening, and a guide mounted on the handle for directing the nuts into the container from the tube.

ELIJAH ANSON FLEMING.